United States Patent
Shimizu et al.

(10) Patent No.: US 12,441,250 B2
(45) Date of Patent: Oct. 14, 2025

(54) DISPLAY SYSTEM AND DISPLAY METHOD

(71) Applicant: HONDA MOTOR CO., LTD., Tokyo (JP)

(72) Inventors: Manabu Shimizu, Wako (JP); Yuji Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 146 days.

(21) Appl. No.: 18/451,913

(22) Filed: Aug. 18, 2023

(65) Prior Publication Data

US 2024/0075879 A1 Mar. 7, 2024

(30) Foreign Application Priority Data

Sep. 1, 2022 (JP) ................. 2022-139220

(51) Int. Cl.
*B60R 1/27* (2022.01)
*B60K 35/28* (2024.01)
*B60K 35/29* (2024.01)
*B60K 35/60* (2024.01)

(52) U.S. Cl.
CPC ............... *B60R 1/27* (2022.01); *B60K 35/60* (2024.01); *B60K 35/28* (2024.01); *B60K 35/29* (2024.01); *B60K 2360/171* (2024.01); *B60K 2360/177* (2024.01); *B60K 2360/1868* (2024.01); *B60R 2300/304* (2013.01); *B60R 2300/607* (2013.01)

(58) Field of Classification Search
CPC ................ B60R 1/27; B60R 2300/304; B60R 2300/607; B60R 1/00; B60K 35/60; B60K 35/28; B60K 35/29; B60K 2360/171; B60K 2360/177; B60K 2360/1868; B60K 35/00; B60W 50/14; B60W 30/0956; B60W 50/00; B60W 2050/0002; B60W 2050/146
See application file for complete search history.

(56) References Cited

U.S. PATENT DOCUMENTS

2014/0063064 A1* 3/2014 Seo ................... G08G 1/096741
   345/633
2020/0050002 A1* 2/2020 Higashiyama ......... B60K 35/29
2021/0078503 A1* 3/2021 Horihata ................... G09G 5/22

FOREIGN PATENT DOCUMENTS

JP 2013-200819 A 10/2013

* cited by examiner

Primary Examiner — Farzana Hossain
(74) Attorney, Agent, or Firm — Rankin, Hill & Clark LLP

(57) ABSTRACT

A display system includes a processor that acquires a current location of an own vehicle, generates a virtual environment image showing a surrounding environment of the own vehicle based on a current location of the own vehicle and map information, extracts a participant video image, the participant video image being a video image portion of a traffic participant from the real environment video image, determines the presence of an intention to turn of a driver of the own vehicle, and generates and displays on a display device a composite image by inlaying the participant video image into the virtual environment image at a corresponding position.

11 Claims, 9 Drawing Sheets

DISPLAY SYSTEM AND DISPLAY METHOD

INCORPORATION BY REFERENCE

The present application claims priority under 35 U.S.C. § 119 to Japanese Patent Application No. 2022-139220 filed on Sep. 1, 2022. The content of the application is incorporated herein by reference in its entirety.

BACKGROUND OF THE INVENTION

Field of the Invention

The present invention relates to a display system and display method that displays a surrounding environment of an own vehicle.

Description of the Related Art

In recent years, there is an increasing effort to provide access to sustainable transit systems that also consider people in weak situations among traffic participants. In order to achieve this, commitment to research and development is ongoing, which may further improve safety and convenience of transportation through research and development relating to preventive safety technology.

Japanese Patent Laid-Open No. 2013-200819 discloses an image receiving and displaying device that geometrically converts a video image imaged by using a camera installed outside an own vehicle into a video image viewed from a location above the own vehicle or a video image viewed from a virtual mirror at a front part of the vehicle, and displays it.

By the way, in preventive safety technology, for safety driving of an own vehicle, it is a challenge to convey a traffic environment surrounding an own vehicle in a recognizable manner to a driver in providing information through a display device to complement driver's perception.

In this connection, a video image displayed by the technology disclosed in Japanese Patent Laid-Open No. 2013-200819 is a video image viewed from a fixed point such as a location above an own vehicle or from a virtual mirror and may be much different from an actual scene that is visually captured for a driver who is required to dynamically change the direction of his/her line of sight by following transitions between driving scenes such as driving straight ahead, turning left or right and the like. Therefore, the aforementioned conventional technology has limitations on conveying a traffic environment in a recognizable manner to a driver.

In order to solve the problem above, an object of the application is to achieve preventive safety for own-vehicle driving by conveying a traffic environment surrounding the own vehicle to a driver in a recognizable manner in accordance with an actual driving scene. It consequently contributes to advancement of sustainable transit systems.

SUMMARY OF THE INVENTION

One aspect of the present invention is a display system including a location acquiring unit that acquires a current location of an own vehicle, an environment image generating unit that generates a virtual environment image based on a current location of the own vehicle and map information, the virtual environment image being a virtual image showing a surrounding environment of the own vehicle, a partial video image extracting unit that acquires a real environment video image of a surrounding of the own vehicle and extracts a participant video image, the participant video image being a video image portion of a traffic participant from the real environment video image, a turn determining unit that determines whether a driver of the own vehicle is trying to turn or not, and a display control unit that generates and displays on a display device a composite image by inlaying each of the extracted participant video image into the virtual environment image at a corresponding position on the virtual environment image, wherein the environment image generating unit, if the own vehicle is not trying to turn, generates a front virtual image including the virtual environment image corresponding to a front line of sight of the driver and, if the own vehicle is trying to turn, generates a lateral virtual image including the virtual environment image corresponding to a line of sight in a direction of turn of the driver, and wherein the display control unit, if the own vehicle is not trying to turn, displays the composite image based on the front virtual image on the display device and, if the own vehicle is trying to turn, displays the composite image based on the lateral virtual image on the display device.

According to another aspect of the present invention, the display control unit displays the composite image based on the lateral virtual image in a display range displaced toward the direction of turn from a display range of the composite image based on the front virtual image on a display screen of the display device.

According to another aspect of the present invention, the display control unit displays the composite image on the display screen of the display device such that the position of the composite image corresponding to a travelling direction of the own vehicle is at the center of the display range of the composite image.

According to another aspect of the present invention, the display screen of the display device extends in a horizontally-oriented manner in a vehicle width direction, the display panel being provided on an instrument panel of the own vehicle.

According to another aspect of the present invention, the display screen of the display device is composed of a plurality of display panels arranged in a vehicle width direction on an instrument panel of the own vehicle.

According to another aspect of the present invention, the display device includes an additional display panel arranged in front of a pillar of the own vehicle.

According to another aspect of the present invention, if the own vehicle is trying to turn, the environment image generating unit generates the lateral virtual image including the virtual environment image corresponding to the line of sight in the direction of turn of the driver by increasing the angle of view of the virtual environment image corresponding to a front line of sight of the driver in the direction of turn.

According to another aspect of the present invention, if the own vehicle is trying to turn, the display control unit displays the composite image based on the lateral virtual image in a display range acquired by extending toward the direction of turn a display range of the composite image based on the front virtual image on a display screen of the display device.

According to another aspect of the present invention, the display control unit generates a composite image based on the virtual environment image and the participant video image at a current time at predetermined time intervals and displays the composite image at the current time in real time on the display device.

According to another aspect of the present invention, the virtual environment image is an image having a bird's eye view of the surrounding environment including a current location of the own vehicle, and a virtual own-vehicle representation, which is a graphic representation indicating the own vehicle, is overlaid at a position corresponding to the own vehicle on the virtual environment image.

Another aspect of the present invention is a display method executed by a computer included in a display system, the method including the steps of acquiring a current location of an own vehicle, generating a virtual environment image based on a current location of the own vehicle and map information, the virtual environment image being a virtual image showing a surrounding environment of the own vehicle, acquiring a real environment video image of a surrounding of the own vehicle and extracting a participant video image, the participant video image being a video image portion of a traffic participant from the real environment video image, determining whether a driver of the own vehicle is trying to turn or not, and generating and displaying on a display device a composite image by inlaying each of the extracted participant video image into the virtual environment image at a corresponding position on the virtual environment image, wherein the step of generating, if the own vehicle is not trying to turn, generates a front virtual image including the virtual environment image corresponding to a front line of sight of the driver and, if the own vehicle is trying to turn, generates a lateral virtual image including the virtual environment image corresponding to a line of sight in a direction of turn of the driver, and wherein the step of displaying, if the own vehicle is not trying to turn, displays the composite image based on the front virtual image on the display device and, if the own vehicle is trying to turn, displays the composite image based on the lateral virtual image on the display device.

According to an aspect of the present invention, a traffic environment surrounding an own vehicle can be conveyed to a driver in a recognizable manner in accordance with an actual driving scene.

DETAILED DESCRIPTION OF THE PREFERRED EMBODIMENTS

Embodiments of the present invention are described below with reference to drawings.

Figure 1:
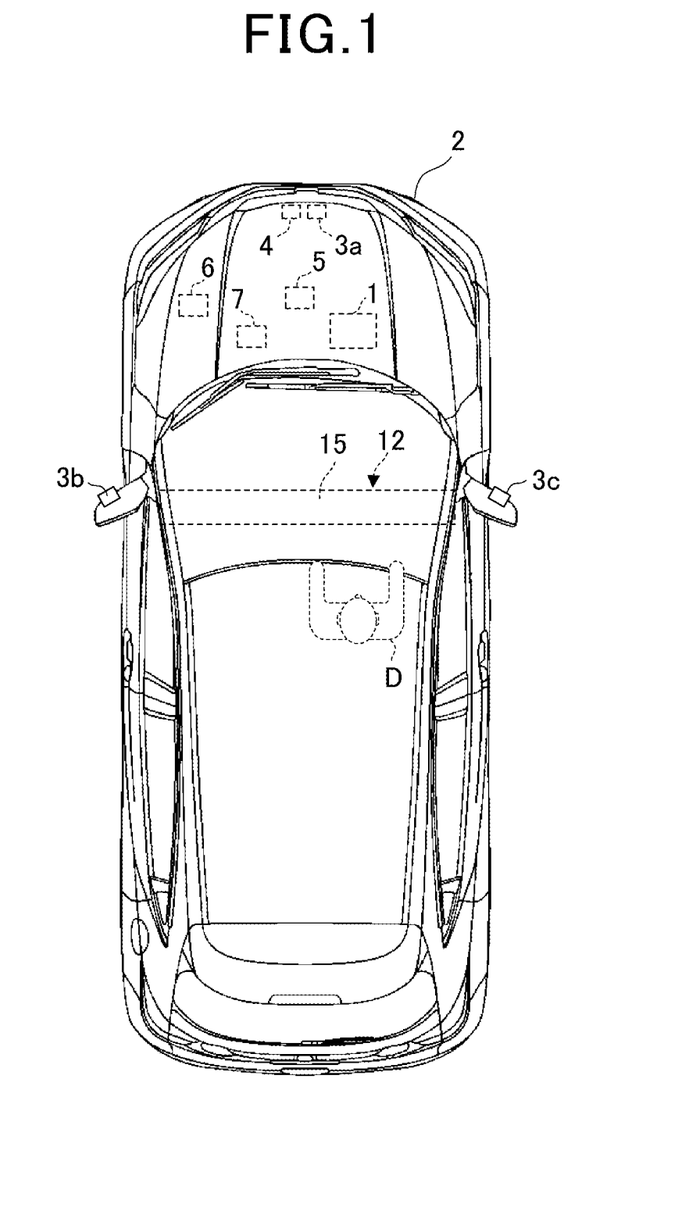
FIG. 1 is a diagram showing an example of a configuration of an own vehicle in which a display system is mounted according to one embodiment of the present invention.
Figure 2:
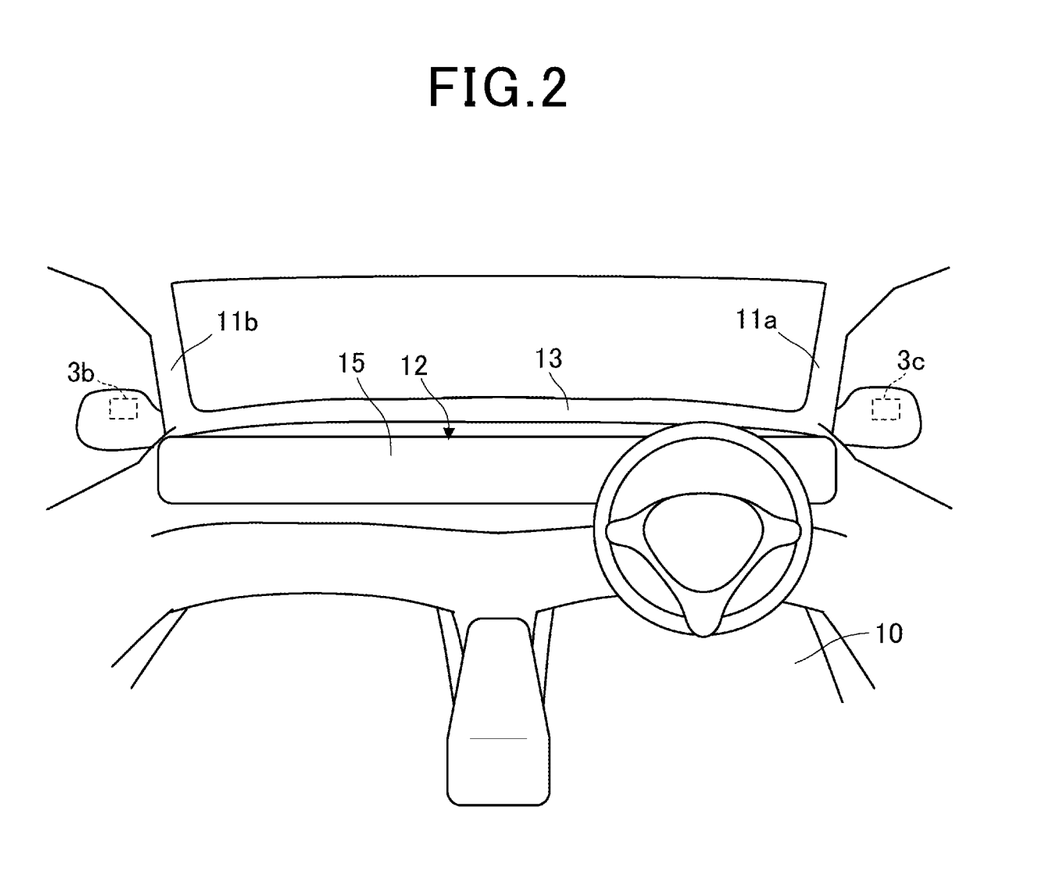
FIG. 2 is a diagram showing an example of a configuration of an interior of the own vehicle.

FIG. 1 is a diagram showing an example of a configuration of an own vehicle 2 that is a vehicle in which a display system 1 is mounted according to one embodiment of the present invention. FIG. 2 is a diagram showing an example of a configuration of an interior of the own vehicle 2. The display system 1 is mounted in the own vehicle 2 and displays, on a display device 12, a virtual environment image that is a virtual image of a surrounding environment of the own vehicle 2 (hereinafter, simply also called "surrounding environment"), and conveys presence of a traffic participant within the surrounding environment to a driver D.

A front camera 3a that captures a front part of the own vehicle 2 of the surrounding environment and a left lateral camera 3b and a right lateral camera 3c that capture a right and left lateral parts of the own vehicle 2 are deployed in the own vehicle 2. Hereinafter, the front camera 3a, the left lateral camera 3b and a right lateral camera 3c are also collectively called a camera 3. The front camera 3a is deployed, for example, near a front bumper, and the left lateral camera 3b and the right lateral camera 3c are deployed, for example, on left and right door mirrors. The own vehicle 2 may further include a rear camera (not shown) that captures a surrounding environment in a rear part of the vehicle.

An object detection device 4 that detects an object present in a surrounding environment is further mounted in the own vehicle 2. The object detection device 4 may be, for example, a radar, a sonar, and/or a lidar.

A vehicle monitoring device 5 that collects at least information on a running speed of the own vehicle 2 and information on an operation of a direction indicator lamp (not shown), a GNSS receiver 6 that receives location information on a current location of the own vehicle 2 from a GNSS satellite, and a navigation device 7 that performs routing assistance by using map information are further mounted in in the own vehicle 2.

In the interior of the own vehicle 2, a display device 12 having a horizontally-oriented display panel extending in the vehicle width direction as a display screen 15 is provided on an instrument panel 13. The display device 12 is, for example, a touch panel. The display screen 15 of the display device 12 extends, for example, from a lower part of a pillar 11a on a side close to a driver's seat 10 to a lower part of a pillar 11b on the other hand along the vehicle width direction. Hereinafter, the pillars 11a and 11b are collectively called a pillar 11.

Figure 3:
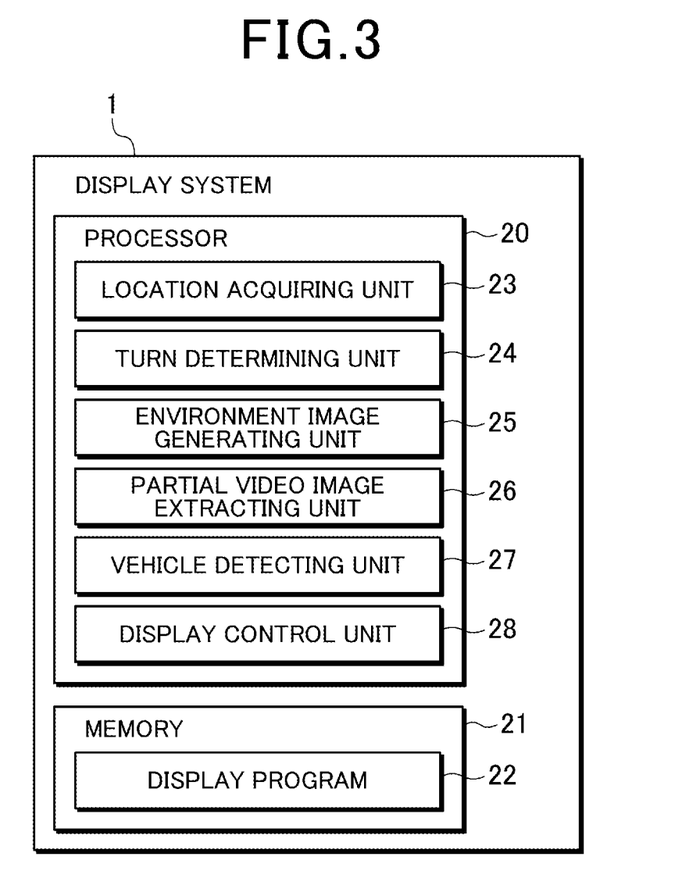
FIG. 3 is a diagram showing a configuration of a display system according to one embodiment of the present invention.

FIG. 3 is a diagram showing a configuration of the display system 1.

The display system 1 has a processor 20 and a memory 21. The memory 21 is implemented by, for example, a volatile and/or nonvolatile semiconductor memory and/or a hard disk device or the like. The processor 20 is, for example, a computer including a CPU and so on. The processor 20 may have a ROM in which a program is written, a RAM for temporarily storing data, and so on. The processor 20 includes, as functional elements or functional units, a location acquiring unit 23, a turn determining unit 24, an environment image generating unit 25, a partial video image extracting unit 26, a vehicle detecting unit 27, and a display control unit 28.

These functional elements included in the processor 20 are implemented by execution by the processor 20 being a computer, for example, of a display program 22 saved in the memory 21.

It should be noted that the display program 22 can be prestored in an arbitrary computer-readable storage medium. Instead of this, each of all or some of the functional elements included in the processor 20 can be implemented by hardware including one or more electronic circuit components.

The location acquiring unit 23 receives location information through the GNSS receiver 6 and acquires a current location of the own vehicle 2.

The turn determining unit 24 determines the presence of an intention of a driver D of the own vehicle 2 to try to turn (that is, an intention of the driver D to turn). For example, the turn determining unit 24 determines whether the driver of the own vehicle 2 is trying to turn or not based on information regarding an operation on a direction indicator lamp (not shown) of the own vehicle 2 and/or information on a planned running route of the own vehicle 2 in accordance with a conventional technology.

In other words, the turn determining unit 24 determines that the driver D is trying to turn to the direction indicated by the lighted direction indicator lamp if, for example, the direction indicator lamp of the own vehicle 2 is operated. The turn determining unit 24 also determines that, for example, when the own vehicle 2 is traveling toward an intersection and if its planned running route indicates a right turn or a left turn at the intersection, the driver D is trying to turn for the right turn or the left turn. Here, information regarding an operation on the direction indicator lamp of the own vehicle 2 can be acquired from the vehicle monitoring device 5. Also, information regarding a planned running route of the own vehicle 2 can be acquired from the navigation device 7.

It should be noted that the own vehicle 2 may be operated by a computer that may perform autonomous driving, instead of the driver D being a human. Therefore, in the following description, as a broad idea embracing a case where the own vehicle 2 is operated by a computer, "a driver of the own vehicle 2 is trying to turn" is simply described as "the own vehicle 2 is trying to turn". In this sense, "intention to turn of the driver D" is interchangeable with "determination of execution of a turn in the own vehicle 2".

The environment image generating unit 25 generates a virtual environment image, which is a virtual image showing a surrounding environment of the own vehicle 2, based on a current location of the own vehicle 2 and map information. The map information can be acquired from, for example, the navigation device 7. According to this embodiment, the virtual environment image generated by the environment image generating unit 25 is a three-dimensional image (3D display image) having a bird's eye view of the surrounding environment, including, for example, the current location of the own vehicle.

According to this embodiment, in particular, if the own vehicle 2 is not trying to turn based on determination on the intention to turn of the driver D by the turn determining unit 24, the environment image generating unit 25 generates a front virtual image including a virtual environment image corresponding to the front line of sight of the driver D (that is, viewed by the front line of sight). Also, when the own vehicle 2 is trying to turn based on the intention to turn of the driver D by the turn determining unit 24, the environment image generating unit 25 generates a lateral virtual image including a virtual environment image corresponding to the line of sight in the direction of turn of the driver D (that is, viewed from the line of sight in the direction of turn).

The partial video image extracting unit 26 acquires a real environment video image of a surrounding of the own vehicle 2 with the camera 3 and extracts a participant video image, the participant video image being a video image portion of a traffic participant from the acquired real environment video image.

The vehicle detecting unit 27 detects, from the real environment video image, a location of a surrounding vehicle that is a vehicle within a surrounding environment and a vehicle attribute including a model, a size, and/or color of the surrounding vehicle. The size of a surrounding vehicle can be calculated based on, for example, an angle of view of the surrounding vehicle in the real environment video image and a distance to the surrounding vehicle detected by the object detection device 4 by following a conventional technology. Also, the model of a surrounding vehicle can be identified by image matching with template images showing sizes and shapes of models such as trucks, buses, automobiles, motorcycles and so on, prestored in the memory 21 by following a conventional technology, for example.

Also, the vehicle detecting unit 27 determines the presence of possibility that the detected surrounding vehicle contacts the own vehicle 2. For example, the vehicle detecting unit 27 determines the presence of possibility of such a contact based on information on a speed of a surrounding vehicle, information on a lighting state of the direction indicator lamp, information on the running speed of the own vehicle 2, and/or a result of the determination on the presence of an intention to turn of the driver D by the turn determining unit 24 by following a conventional technology. Here, the information on a speed of a surrounding vehicle and the information on a lighting state of the direction indicator lamp may be acquired from a real environment video image. Also, the information on the running speed of the own vehicle 2 may be acquired from the vehicle monitoring device 5.

The display control unit 28 generates and displays on the display device 12 a composite image by inlaying each of participant video images extracted by the partial video image extracting unit 26 into the virtual environment image generated by the environment image generating unit 25 at a corresponding position on the virtual environment image. For example, the display control unit 28 generates a composite image based on a virtual environment image and a participant video image at a current time at predetermined time intervals and displays the composite image at the current time in real time on the display device 12.

The size of the participant video image to be inlaid to a virtual environment image can be a size acquired by, for example, reducing the real size calculated for a traffic participant therein to a scale of a virtual environment image at a location for inlaying the participant video image by following a conventional technology. Like the size of a surrounding vehicle described above, the real size of a traffic participant can be calculated based on angle of view of the traffic participant in a real environment video image and a distance to the traffic participant detected by the object detection device 4.

The display control unit 28 may generate a composite image by overlaying a virtual own-vehicle representation being a graphic representation of the own vehicle 2 (or showing the own vehicle 2) at a corresponding location on a virtual environment image. For example, the virtual own-vehicle representation is a graphic indication that imitates a movement of the own vehicle viewed from the rear, and a composite image may be a so-called chasing view from a point of view following the own vehicle from the rear.

According to this embodiment, in particular, the display control unit 28 displays a composite image based on a front virtual image on the display device 12 when the own vehicle 2 is not trying to turn based on the determination regarding driver D's intention to turn by the turn determining unit 24. Also, the display control unit 28 displays a composite image based on a lateral virtual image on the display device 12 when the own vehicle 2 is trying to turn based on the determination regarding driver D's intention to turn by the turn determining unit 24.

Also, at that time, the display control unit 28 displays a composite image based on the lateral virtual image at a position displaced toward the direction of turn from the position for displaying the composite image based on the front virtual image on the display screen 15 of the display device 12.

Figure 4:
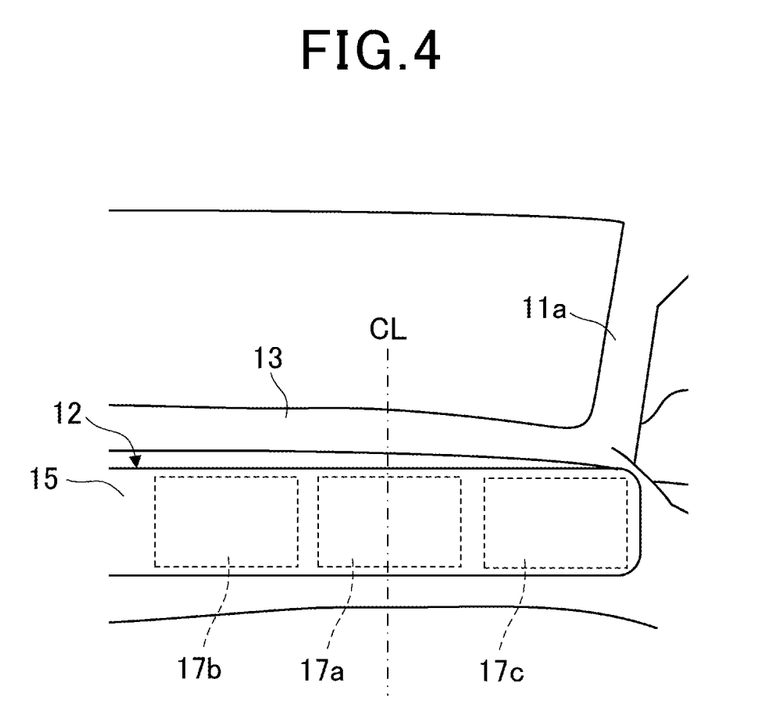
FIG. 4 is a diagram showing an example of a display position on a display device of a composite image based on a front virtual image and a composite image based on a lateral virtual image.

FIG. 4 is a diagram showing an example of a display position on the display device 12 of a composite image based on a front virtual image and a composite image based on a lateral virtual image. FIG. 4 is a diagram having an enlarged front part of the driver's seat 10 in the illustration of the vehicle interior shown in FIG. 2 and does not show a steering wheel. A line CL shown by a one dot-dash line is a line acquired by projecting a center line of the body of a driver D sitting on the driver's seat 10 to the instrument panel 13 along the length direction of the own vehicle 2.

In the example in FIG. 4, a front image range 17*a* that is a display range of a composite image based on a front virtual image is set to a rectangular range indicated by the shown broken line about the line CL. Also, a left image range 17*b* that is a display range of a composite image based on a lateral virtual image from the point of view in the left direction for a left turn is set to a position displaced to the left that is a direction of the turn with respect to the front image range 17*a*. Also, a right image range 17*c* that is a display range of a composite image based on a lateral virtual image from the point of view in the right direction for a right turn is set to a position displaced to the right that is a direction of turn with respect to the front image range 17*a* and near a bottom part of the pillar 11*a*.

For example, the display control unit 28 displays a composite image on the display screen 15 of the display device 12 such that the position of the composite image corresponding to the travelling direction of the own vehicle is at the center of the display range of the composite image. Thus, the driver D is more facilitated to intuitively recognize a traffic environment from the displayed composite image.

It should be noted that, since a composite image based on a front virtual image, a composite image based on a lateral virtual image from a point of view in a left direction, and a composite image based on a lateral virtual image from a point of view in a right direction are each displayed selectively (that is, while one composite image is being displayed, the other composite image is not displayed), the front image range 17*a*, the left image range 17*b*, and the right image range 17*c* are not necessarily required to be separated from each other as shown, but partial regions may be overlapped with each other.

In an aspect where a composite image moves among the front image range 17*a*, the left image range 17*b*, and the right image range 17*c*, the display control unit 28 can switch for display among respective composite images for driving straight ahead, turning left and turning right, for example.

In the display system 1 having the aforementioned configuration, since a surrounding environment of the own vehicle 2 is displayed on the display device 12 as a composite image, the driver D can recognize on the screen of the display device 12 the presence of a pedestrian or the like existing at a blind spot such as behind the pillar 11 when turning at an intersection where many items regarding a traffic condition are to be checked, for example, the driving load can be reduced. Also, a video image of a traffic participant is inlaid as a participant video image of the composite image displayed on the display device 12, the presence of a traffic participant such as a pedestrian can be conveyed to a driver D realistically (that is, in a realistic aspect).

Also, in the display system 1, since a composite image is based on a three-dimensional virtual environment image from a bird's eye view of surroundings of the current location of the own vehicle 2, the driver D can easily grasp a positional relationship between a traffic participant present in the surrounding environment and the own vehicle and a positional relationship between traffic participants, compared to a bird's eye view by which a video image combining a plurality of camera images is easily distorted.

In other words, in the display system 1, a great effect is provided that, since a video image of a traffic participant is inlaid into a virtual environment image while allowing for easy recognition of a three-dimensional positional relationship in the traffic environment including the own vehicle and the traffic participant based on a three-dimensional virtual environment image, the presence of the traffic participant and details of its movement can be conveyed to the driver D realistically.

Also, in the display system 1, since, when the own vehicle 2 is not trying to turn, a composite image based on a front virtual image corresponding to a front line of sight of the driver D is displayed, and when the own vehicle 2 is trying to turn, a composite image based on a lateral virtual image corresponding to a line of sight in the direction of turn of the driver D is displayed, a traffic condition in the direction of turn can be conveyed to the driver D with the image that facilitates intuitive recognition thereof along the line of sight of the driver D.

Also, in the display system 1, since, when the own vehicle 2 is trying to turn, the display position of the composite image on the display device 12 is displaced toward the direction of turn more than the display position when the own vehicle 2 is not trying to turn, the position of the composite image on the display device 12 is moved to the direction to which the head of the driver D turns while the own vehicle 2 is turning. Thus, in the display system 1, the amount of movement of the line of sight required for visually checking the composite image by the driver D can be reduced, allowing to facilitate intuitive recognition of a traffic condition from the composite image.

Also, by presenting a traffic participant in a participant video image, the driver D can easily correlate between a participant video image and a traffic participant present in the real environment and is facilitated to recognize the traffic participant in the real space. Furthermore, since the virtual environment image can be displayed with unnecessary information omitted other than, for example, a positional dimension of an intersection, a lane, and sidewalks, the driver D can concentrate on necessary information without being confused by the unnecessary information.

It should be noted that, in the display system 1, the display control unit 28 may highlight a participant video image of a traffic participant being a pedestrian or a bicycle in a displayed composite image. The highlighting above can be performed by, for example, displaying in a warm color at least a part of a frame line of an outer circumference (that is, boundaries of a virtual environment image) of a participant video image, increasing or changing (blinking, for example) the luminance of the participant video image to be higher than that of its surroundings, increasing a warm tint of the participant video image, or the like.

Thus, in the display system 1, the existence of a pedestrian and a bicycle that can be easily overlooked by the driver D can be conveyed to the driver D more securely and realistically.

Also, for a traffic participant being a surrounding vehicle, the display control unit 28 may generate a composite image by inlaying a virtual vehicle representation being a graphic representation according to a vehicle attribute of the surrounding vehicle detected by the vehicle detecting unit 27 at a corresponding position on a virtual environment image as a surrounding vehicle indication in the composite image. For example, if the model indicated by a vehicle attribute is a truck, the display control unit 28 can generate a composite image by inlaying a virtual vehicle representation of the truck prestored in the memory 21 into a virtual environment image by using a color and a size depending on the color and size indicated by the vehicle attribute.

Thus, in the display system 1, since a virtual vehicle representation is used for display of a vehicle with detail information (for example, sense of speed, color, sense of size, model) that can be easily represented by using a graphic representation among traffic participants, the processing load required for generation and output of a composite image to a display device can be reduced.

Figure 5:
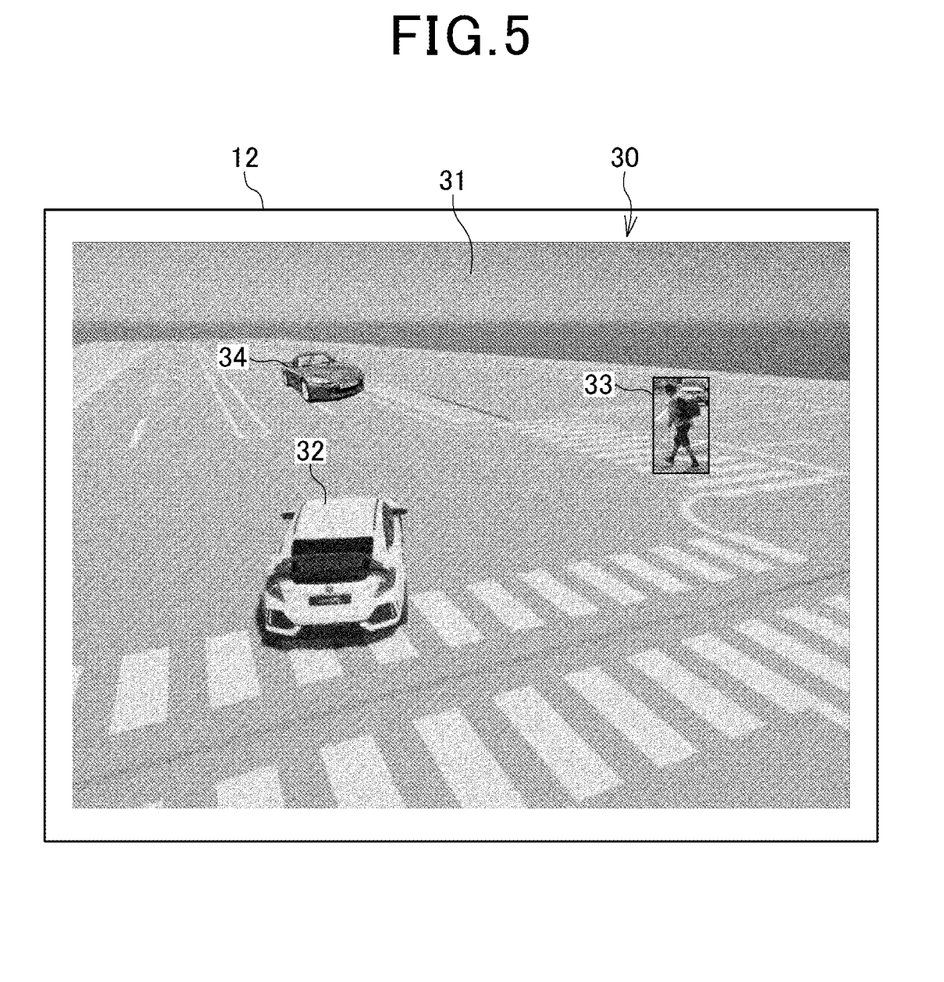
FIG. 5 is a diagram showing an example of a composite image based on a lateral virtual image when the own vehicle turns right.

FIG. 5 is a diagram showing an example of a composite image based on a lateral virtual image that the display control unit 28 displays on the display device 12 when the own vehicle 2 turns to the right at an intersection. In a composite image 30 based on a lateral virtual image, virtual own-vehicle representation 32 indicating the own vehicle 2, a participant video image 33 indicating a traffic participant being a pedestrian, a surrounding vehicle indication 34 of a surrounding vehicle approaching the own vehicle 2 as an oncoming car are displayed in a three-dimensional virtual environment image 31 looking down at a surrounding environment at the current location of the own vehicle 2. In the example in FIG. 5, a default virtual vehicle representation is used for the surrounding vehicle indication 34. In the composite image 30 shown in FIG. 5, for example, when the driver D of the own vehicle 2 touches the surrounding vehicle indication 34, the display control unit 28 switches the surrounding vehicle indication 34 for each touch from a virtual vehicle representation of a surrounding vehicle to a participant video image and vice versa.

In response to a touch on a virtual vehicle representation that is a surrounding vehicle indication on a composite image displayed on the display device 12 that is a touch panel, the display control unit 28 may switch the surrounding vehicle indication from the virtual vehicle representation to a participant video image of a traffic participant corresponding to the virtual vehicle representation. In other words, when the surrounding vehicle indication has a virtual vehicle representation as a default and in response to a touch operation on a composite image displayed on the display device 12, the surrounding vehicle indication can be switched between the virtual vehicle representation and the participant video image. For example, in the composite image 30 shown in FIG. 5, when the driver D of the own vehicle 2 touches the surrounding vehicle indication 34, the display control unit 28 switches, for each touch, the surrounding vehicle indication 34 from a virtual vehicle representation of a surrounding vehicle to a participant video image or vice versa.

Thus, in the display system 1, the driver D can switch the surrounding vehicle indication to a participant video image as needed and can acquire more detail visual information regarding the surrounding vehicle.

When there is a possibility that a surrounding vehicle contacts the own vehicle, that is, if the vehicle detecting unit 27 determines that there is a possibility that a surrounding vehicle contacts the own vehicle 2, the display control unit 28 may further highlight a surrounding vehicle indication (virtual vehicle representation or participant video image of the surrounding vehicle) on the composite image.

Thus, in the display system 1, the presence of a surrounding vehicle that may possibly contact or collide can be conveyed more securely to the driver D.

Like the aforementioned highlighting of a participant video image of a traffic participant which is a pedestrian, the highlighting above can be performed by, for example, displaying a warm-colored frame line on a surrounding vehicle indication, increasing or changing over time the luminance of a surrounding vehicle indication to be higher than that of its surroundings, increasing a warm-color tint of a surrounding vehicle indication, or the like.

Next, a procedure of operations in the display system 1 is described.

Figure 6:
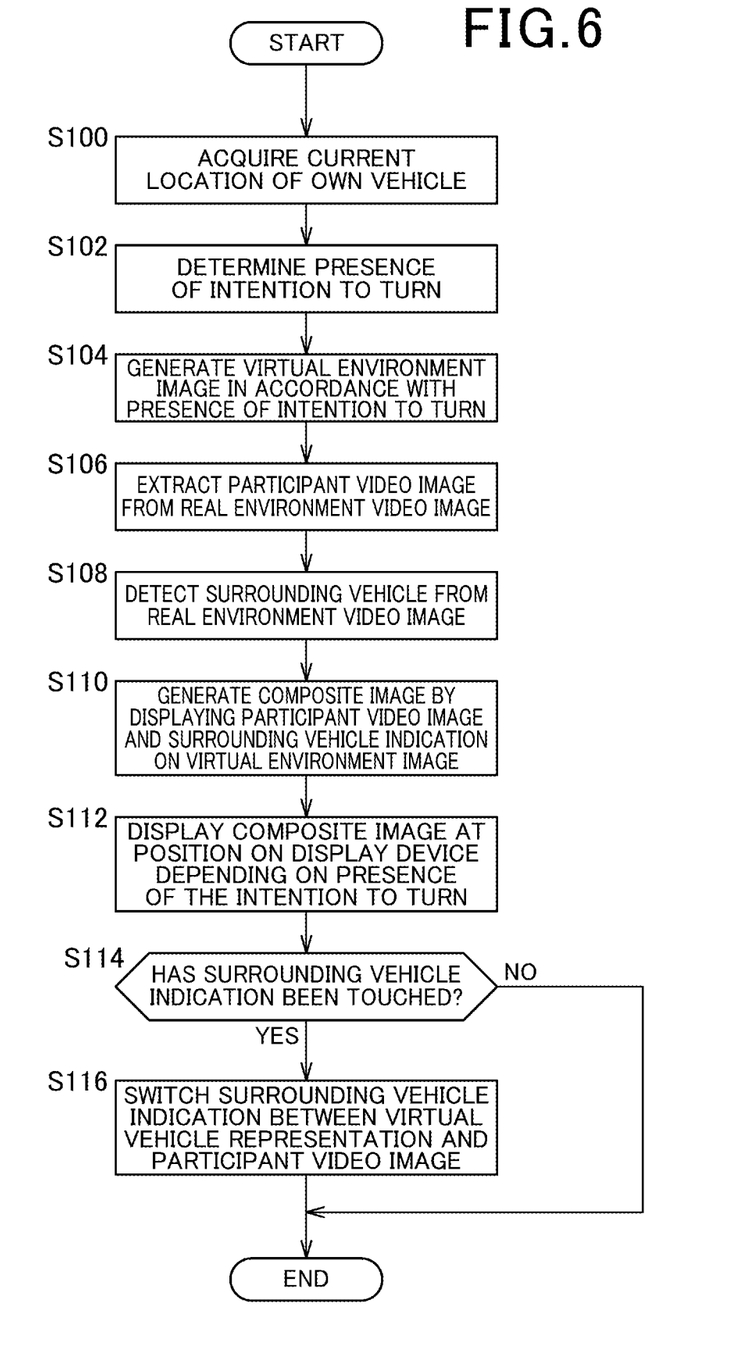
FIG. 6 is a flowchart showing a procedure of a display method executed by a processor in a display system.

FIG. 6 is a flowchart showing a procedure of processing of a display method for displaying a surrounding environment of the own vehicle 2, which is executed by the processor 20 that is a computer in the display system 1. This processing is repetitively executed.

When the processing starts, the location acquiring unit 23 first acquires a current location of the own vehicle 2 (S100). Also, the turn determining unit 24 determines the presence of an intention to turn of the driver D of the own vehicle 2 (S102). Subsequently, based on the current location of the own vehicle 2 and map information and the determination result of the presence of the intention to turn, the environment image generating unit 25 generates a virtual environment image that is a virtual image showing a surrounding environment of the own vehicle 2 in accordance with the presence of the intention to turn (S104). Here, the description "generate a virtual environment image in accordance with the presence of the intention to turn" refers to generating a front virtual image if the own vehicle 2 is not trying to turn and generating a lateral virtual image if the own vehicle 2 is trying to turn.

Next, the partial video image extracting unit 26 acquires a real environment video image of a surrounding of the own vehicle 2 from the vehicle-mounted camera 3 and extracts a participant video image that is a video image portion of a traffic participant from the real environment video image (S106). Also, the vehicle detecting unit 27 detects a location of a surrounding vehicle that is a vehicle within the surrounding environment and vehicle attributes including a model, size, and/or color from the real environment video image above (S108). At that time, the vehicle detecting unit 27 may determine the presence of the possibility that the detected surrounding vehicle contacts the own vehicle.

Next, the display control unit 28 generates a composite image by inlaying, into the virtual environment image, a surrounding vehicle indication showing the detected surrounding vehicle and a participant video image of at least the extracted pedestrian at corresponding positions on the virtual environment image (S110). Here, the surrounding vehicle indication above may be a virtual vehicle representation showing the surrounding vehicle as a default.

Then, the display control unit 28 displays the generated composite image at a position depending on the presence of the intention to turn on the display device 12 (S112). According to this embodiment, particularly, in order to display a composite image based on a lateral virtual image on the display device 12, the display control unit 28 displays it at a position displaced toward the direction of turn more than the position for displaying a composite image based on a front virtual image.

In step S112, the display control unit 28 may highlight participant video images of a pedestrian and/or a bicycle as described above. If the vehicle detecting unit 27 determines that there is a possibility that the detected surrounding vehicle contacts the own vehicle, the display control unit 28 may highlight the corresponding surrounding vehicle indication.

Next, the display control unit 28 determines whether any surrounding vehicle indication on the composite image displayed on the display device 12 that is a touch panel has been touched or not (S114). Then, if a surrounding vehicle indication has been touched (YES in S114), the display control unit 28 switches the surrounding vehicle indication between a virtual vehicle representation and a participant video image of the surrounding vehicle (S116), and the processing ends. On the other hand, if no surrounding vehicle indication has been touched (NO in S114), the display control unit 28 exits the processing.

After the processing ends, the processor 20 returns to step S100 and the processing is repeated where a composite image at the current time is displayed in real time on the display device 12.

Other Embodiments

Figure 7:
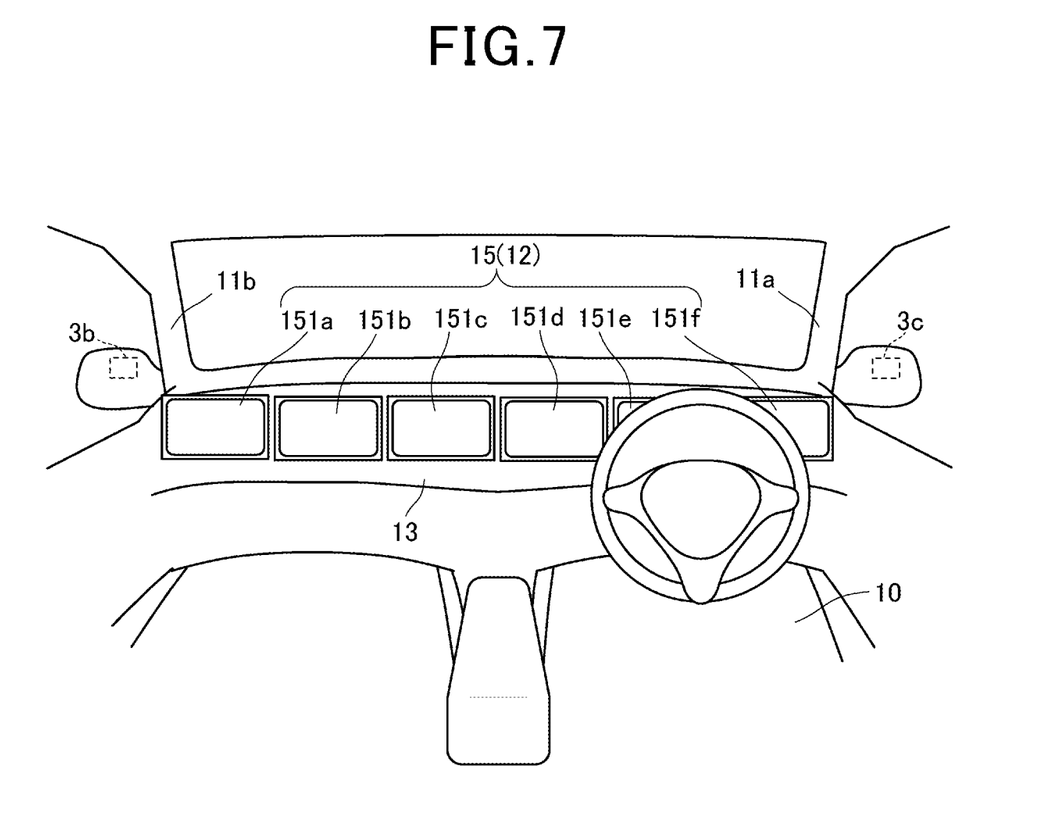
FIG. 7 is a diagram showing another example of the display device on which the display system displays a composite image.

Although the display screen 15 of the display device 12 extends in a horizontally-oriented manner in the vehicle width direction according to the aforementioned embodiment, the invention is not limited thereto. The display screen 15 of the display device 12 may be composed of an arbitrary number of display panels such as, for example, six display panels 151*a*, 151*b*, 151*c*, 151*d*, 151*e*, and 151*f* arranged in the vehicle width direction on the instrument panel 13, as shown in FIG. 7. Hereinafter, the display panels 151*a*, 151*b*, 151*c*, 151*d*, 151*e*, and 151*f* are collectively called display panels 151. If the own vehicle 2 is trying to turn and for a right turn and/or a left turn, the display control unit 28 can display a composite image based on lateral virtual image on another display panel 151 closer to the direction of turn than one display panel 151 that displays a composite image based on a front virtual image. Thus, the display device 12 that can display a composite image based on a front virtual image and a composite image based on a lateral virtual image at positions displaced from each other can be easily constructed.

Figure 8:
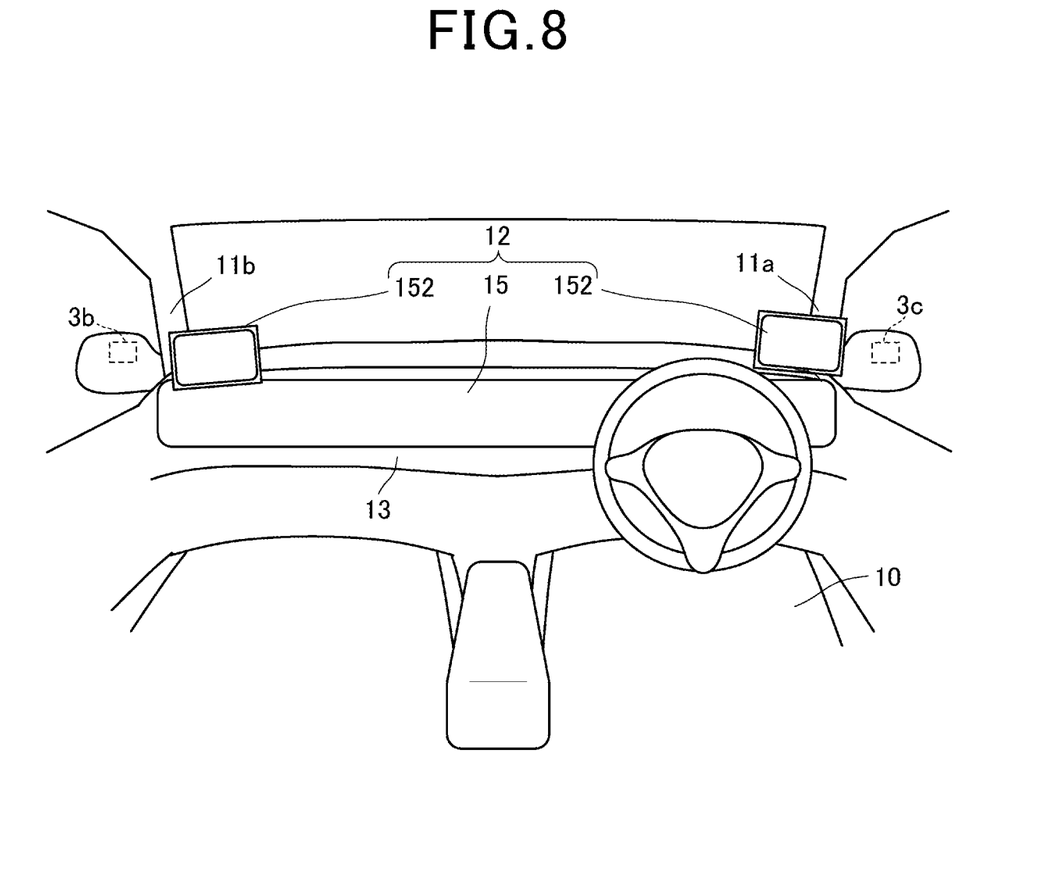
FIG. 8 is a diagram showing another example of the display device on which the display system displays a composite image.

Also, the display device 12 may include an additional display panel 152 arranged in front of at least one of the pillars 11 of the own vehicle 2 as shown in FIG. 8. If the own vehicle 2 is trying to turn and for a right turn and/or a left turn, the display control unit 28 can display a composite image based on a lateral virtual image on an additional display panel 152 closer to the direction of turn. Thus, the amount of movement of the line of sight required by the driver D for visually checking the composite image can be further reduced. The same is true in the configuration shown in FIG. 7.

Also, if the own vehicle 2 is trying to turn, the environment image generating unit 25 may generate a lateral virtual image including a virtual environment image corresponding to the line of sight in the direction of turn of the driver D as a lateral virtual image by increasing the angle of view of the virtual environment image corresponding to a front line of sight of the driver D in the direction of turn. Thus, since a seamless virtual image that is continuous from the front line of sight to the lateral line of sight similar to a scene that can be seen as the driver D moves his/her line of sight can be displayed, a virtual image facilitating more intuitive recognition can be provided to the driver D.

Figure 9:
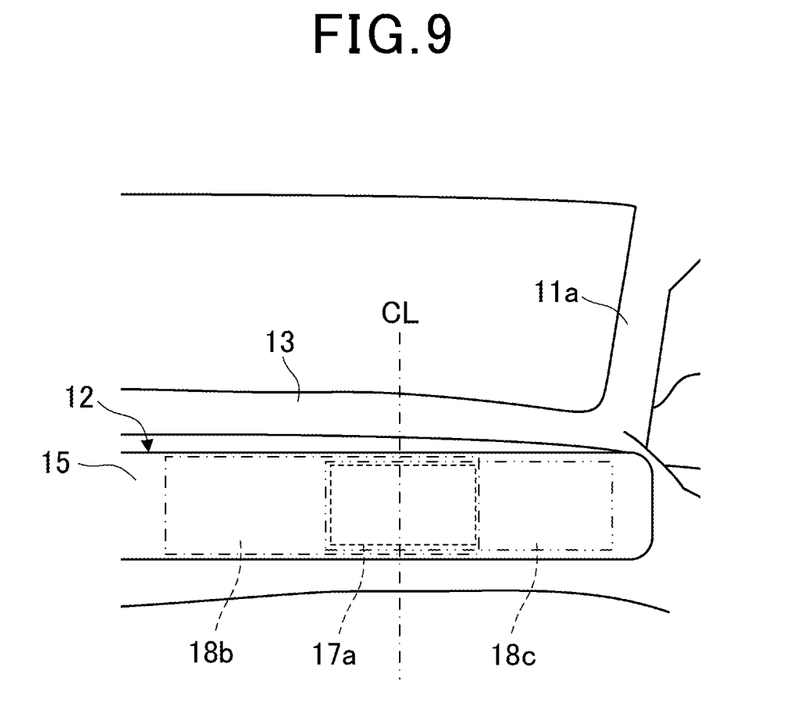
FIG. 9 is a diagram showing another example of the display position on the display device of a composite image based on a front virtual image and a composite image based on a lateral virtual image.

For the lateral virtual image described above, as shown in FIG. 9, for example, the display control unit 28 displays a composite image based on a lateral virtual image on the display screen 15 of the display device 12 in a left image range 18*b* (the shown one dot-dash rectangular range) or a right image range 18*c* (the shown two dot-dash rectangular range) that is a display range acquired by extending toward the direction of turn the front image range 17*a* (the shown dash rectangle) being a display range for a composite image based on a front virtual image. Thus, since a lateral virtual image can be displayed in the display range extended in the direction of movement of the line of sight by the driver D for turning from a front line of sight to a lateral line of sight, a virtual image can be provided to the driver D in an aspect facilitating more intuitive recognition.

Also, having described that, according to the aforementioned embodiment, a real environment video image is acquired from the camera 3 mounted in the own vehicle 2, it may be acquired from a street camera existing in a surrounding environment through road-to-vehicle communication or the like.

Also, a real environment video image may be acquired from a vehicle-mounted camera included in a vehicle surrounding the own vehicle 2 through communication over a communication network or vehicle-to-vehicle communication.

Also, having described that, according to the aforementioned embodiment, the display control unit 28 highlights a participant video image of a traffic participant such as a pedestrian and a bicycle, the highlighting may be performed only for pedestrian requiring special attention such as children and elderly people among pedestrians. The highlighting may be blinking or zooming in addition to the aforementioned aspects.

The display control unit 28 can display on the display device 12 a composite image based on a clear virtual environment image independent of an environment condition even when direct visibility is poor such as during nighttime, in the rain or the like.

The camera 3 may be an infrared camera. Thus, the existence of a pedestrian that cannot be recognized by the naked eye in the dark can be conveyed on the composite image to the driver D.

In response to a touch at an arbitrary position on a composite image displayed on the display device 12, the display control unit 28 may generate a composite image by further inlaying a partial video image corresponding to the touched position in the real environment video image into a virtual environment image.

It should be noted that the present invention is not limited to the configurations of the aforementioned embodiments and can be implemented in various aspects without departing from the spirit and scope of the present invention.

[Configurations Supported by the Aforementioned Embodiments]

The aforementioned embodiments support the following configurations.

(Configuration 1) A display system including a location acquiring unit that acquires a current location of an own vehicle, an environment image generating unit that generates a virtual environment image based on a current location of the own vehicle and map information, the virtual environment image being a virtual image showing a surrounding environment of the own vehicle, a partial video image extracting unit that acquires a real environment video image of a surrounding of the own vehicle and extracts a participant video image, the participant video image being a video image portion of a traffic participant from the real environment video image, a turn determining unit that determines whether a driver of the own vehicle is trying to turn or not, and a display control unit that generates and displays on a display device a composite image by inlaying each of the extracted participant video image into the virtual environment image at a corresponding position on the virtual environment image, wherein the environment image generating unit, if the own vehicle is not trying to turn, generates a front virtual image including the virtual environment image corresponding to a front line of sight of the driver and, if the own vehicle is trying to turn, generates a lateral virtual image including the virtual environment image corresponding to a line of sight in a direction of turn of the driver, and wherein the display control unit, if the own vehicle is not trying to turn, displays the composite image based on the front virtual image on the display device and, if the own vehicle is trying to turn, displays the composite image based on the lateral virtual image on the display device.

According to the display system of Configuration 1, since the point of view of a composite image to be displayed on a display device is changed in accordance with the driving scene (whether turning is intended or not), the driver is facilitated to intuitively recognize a traffic environment in the direction the driver is going to move. In other words, according to the display system of Configuration 1, a traffic environment surrounding the own vehicle can be conveyed to the driver in a recognizable manner in accordance with the real driving scene.

(Configuration 2) The display system according to Configuration 1, wherein the display control unit displays the composite image based on the lateral virtual image at a position displaced toward the direction of turn from a position where the composite image based on the front virtual image is displayed on a display screen of the display device.

According to the display system of Configuration 2, since the display position of a composite image to be displayed on a display device is changed in accordance with the driving scene, the amount of movement of the line of sight for visually checking the composite image can be reduced, and the driver is facilitated to intuitively recognize a traffic situation in the direction the driver is going to move.

(Configuration 3) The display system according to Configuration 1 or 2, wherein the display control unit displays the composite image on the display screen of the display device such that the position of the composite image corresponding to a travelling direction of the own vehicle is at the center of the display range of the composite image.

According to the display system of Configuration 3, the driver is facilitated to intuitively recognize a traffic environment from the displayed composite image.

(Configuration 4) The display system according to Configuration 2 or 3, wherein the display screen of the display device is a display panel that extends in a horizontally-oriented manner in a vehicle width direction, the display panel being provided on an instrument panel of the own vehicle.

According to the display system of Configuration 4, the display position of a composite image based on the lateral virtual image can be easily displayed at a position displaced toward the direction of turn from a position for displaying the composite image based on the front virtual image.

(Configuration 5) The display system according to Configuration 2 or 3, wherein the display screen of the display device is composed of a plurality of display panels arranged in a vehicle width direction on an instrument panel of the own vehicle.

According to the display system of Configuration 5, a display device capable of displaying a composite image based on a front virtual image and a composite image based on a lateral virtual image at positions that are displaced from each other can be easily constructed.

(Configuration 6) The display system according to Configuration 4 or 5, wherein the display device includes an additional display panel arranged in front of a pillar of the own vehicle.

According to the display system of Configuration 6, since the composite image is displayed near the direction of the line of sight of the driver when turning, the amount of movement of the line of sight required by the driver for visually checking the composite image can further be reduced.

(Configuration 7) The display system according to Configuration 1, wherein, if the own vehicle is trying to turn, the environment image generating unit generates the lateral virtual image including the virtual environment image corresponding to the line of sight in the direction of turn of the driver by increasing the angle of view of the virtual environment image corresponding to a front line of sight of the driver in the direction of turn.

According to the display system of Configuration 7, since a seamless virtual image that is continuous from the front line of sight to the lateral line of sight similar to a scene that can be seen as the driver moves his/her line of sight can be displayed, a virtual image facilitating more intuitive recognition can be provided to the driver.

(Configuration 8) The display system according to Configuration 7, wherein, if the own vehicle is trying to turn, the display control unit displays the composite image based on the lateral virtual image in a display range acquired by extending toward the direction of turn a display range of the composite image based on the front virtual image on a display screen of the display device.

According to the display system of Configuration 8, since the lateral virtual image is displayed in a display range extended in the direction of movement of the line of sight by the driver for turning from a front line of sight to a lateral line of sight, a virtual image can be provided to the driver in an aspect further facilitating intuitive recognition.

(Configuration 9) The display system according to any one of Configurations 1 to 8, wherein the display control unit generates a composite image based on the virtual environment image and the participant video image at a current time at predetermined time intervals and displays the composite image at the current time in real time on the display device.

According to the display system of Configuration 9, the composite image is displayed at a position on the display device by following a movement of the line of sight of the driver in a traffic environment that changes moment by moment so that an appearance or movement of the traffic participant or participants can be conveyed to the driver in an aspect that facilitates spatial recognition and that makes a traffic participant realistic and conspicuous.

(Configuration 10) The display system according to any one of Configurations 1 to 9, wherein the virtual environment image is an image having a bird's eye view of the surrounding environment including a current location of the own vehicle, and a virtual own-vehicle representation, which is a graphic representation indicating the own vehicle, is overlaid at a position corresponding to the own vehicle on the virtual environment image.

According to the display system of Configuration 10, since a virtual environment image from a bird's eye view of surroundings of the current location of the own vehicle including a virtual own-vehicle representation indicating the own vehicle is used as the base, the driver can easily grasp a positional relationship between a traffic participant and the own vehicle and a positional relationship between traffic participants, compared to a bird's eye view combining camera images by which a video image is easily distorted.

(Configuration 11) A display method executed by a computer included in a display system, the method including the steps of acquiring a current location of an own vehicle, generating a virtual environment image based on a current location of the own vehicle and map information, the virtual environment image being a virtual image showing a surrounding environment of the own vehicle, acquiring a real environment video image of a surrounding of the own vehicle and extracting a participant video image, the participant video image being a video image portion of a traffic participant from the real environment video image, determining whether a driver of the own vehicle is trying to turn or not, and generating and displaying on a display device a composite image by inlaying each of the extracted participant video image into the virtual environment image at a corresponding position on the virtual environment image, wherein the step of generating, if the own vehicle is not trying to turn, generates a front virtual image including the virtual environment image corresponding to a front line of sight of the driver and, if the own vehicle is trying to turn, generates a lateral virtual image including the virtual environment image corresponding to a line of sight in a direction of turn of the driver, and wherein the step of displaying, if the own vehicle is not trying to turn, displays the composite image based on the front virtual image on the display device and, if the own vehicle is trying to turn, displays the composite image based on the lateral virtual image on the display device.

According to the display method of Configuration 11, the presence of a traffic participant can be conveyed to the driver realistically with the participant video image while allowing for easy grasp of a traffic environment based on a virtual environment image, and, in addition, a traffic situation in the direction of turn can be conveyed to the driver with an image that is intuitively easy to understand in accordance with the line of sight of the driver D while turning.

REFERENCE SIGNS LIST

1: display system, 2: own vehicle, 3: camera, 3a: front camera, 3b: left lateral camera, 3c: right lateral camera, 4: object detection device, 5: vehicle monitoring device, 6: GNSS receiver, 7: navigation device, 10: driver's seat, 11, 11a, 11b: pillar, 12, 14: display device, 13: instrument panel, 15: display screen, 151, 151a, 151b, 151c, 151d, 151e, 151f: display panel, 152: additional display panel, 17a: front image range, 17b, 18b: left image range, 17c, 18c: right image range, 20: processor, 21: memory, 22: display program, 23: location acquiring unit, 24: turn determining unit, 25: environment image generating unit, 26: partial video image extracting unit, 27: vehicle detecting unit, 28: display control unit, 30: composite image, 31: virtual environment image, 32: virtual own-vehicle representation, 33: participant video image, 34: surrounding vehicle indication, D: driver

What is claimed is:

1. A display system comprising:
    a processor, wherein the processor includes:
        a location acquiring unit that acquires a current location of an own vehicle;
        an environment image generating unit that generates a virtual environment image based on a current location of the own vehicle and map information, the virtual environment image being a virtual image showing a surrounding environment of the own vehicle;
        a partial video image extracting unit that acquires a real environment video image of a surrounding of the own vehicle and extracts a participant video image, the participant video image being a video image portion of a traffic participant from the real environment video image;
        a turn determining unit that determines whether a driver of the own vehicle is trying to turn or not; and
        a display control unit that generates and displays on a display device a composite image by inlaying each of the participant video image that is extracted into the virtual environment image at a corresponding position on the virtual environment image,
    wherein the environment image generating unit, if the own vehicle is not trying to turn, generates a front virtual image including the virtual environment image corresponding to a front line of sight of the driver and, if the own vehicle is trying to turn, generates a lateral virtual image including the virtual environment image corresponding to a line of sight in a direction of turn of the driver, and
    wherein the display control unit, if the own vehicle is not trying to turn, displays the composite image based on the front virtual image on the display device and, if the own vehicle is trying to turn, displays the composite image based on the lateral virtual image on the display device.

2. The display system according to claim 1,
    wherein the display control unit displays the composite image based on the lateral virtual image in a display range displaced toward the direction of turn from a display range of the composite image based on the front virtual image on a display screen of the display device.

3. The display system according to claim 1,
    wherein the display control unit displays the composite image on the display screen of the display device such that the position of the composite image corresponding to a travelling direction of the own vehicle is at the center of the display range of the composite image.

4. The display system according to claim 2,
    wherein the display screen of the display device is a display panel that extends in a horizontally-oriented manner in a vehicle width direction, the display panel being provided on an instrument panel of the own vehicle.

5. The display system according to claim 2,
wherein the display screen of the display device is composed of a plurality of display panels arranged in a vehicle width direction on an instrument panel of the own vehicle.

6. The display system according to claim 4,
wherein the display device includes an additional display panel arranged in front of a pillar of the own vehicle.

7. The display system according to claim 1,
wherein, if the own vehicle is trying to turn, the environment image generating unit generates the lateral virtual image including the virtual environment image corresponding to the line of sight in the direction of turn of the driver by increasing the angle of view of the virtual environment image corresponding to a front line of sight of the driver in the direction of turn.

8. The display system according to claim 7,
wherein, if the own vehicle is trying to turn, the display control unit displays the composite image based on the lateral virtual image in a display range acquired by extending toward the direction of turn a display range of the composite image based on the front virtual image on a display screen of the display device.

9. The display system according to claim 1,
wherein the display control unit generates a composite image based on the virtual environment image and the participant video image at a current time at predetermined time intervals and displays the composite image at the current time in real time on the display device.

10. The display system according to claim 1,
wherein the virtual environment image is an image having a bird's eye view of the surrounding environment including a current location of the own vehicle, and a virtual own-vehicle representation, which is a graphic representation indicating the own vehicle, is overlaid at a position corresponding to the own vehicle on the virtual environment image.

11. A display method executed by a computer included in a display system, the method comprising the steps of:
acquiring a current location of an own vehicle;
generating a virtual environment image based on a current location of the own vehicle and map information, the virtual environment image being a virtual image showing a surrounding environment of the own vehicle;
acquiring a real environment video image of a surrounding of the own vehicle and extracting a participant video image, the participant video image being a video image portion of a traffic participant from the real environment video image;
determining whether a driver of the own vehicle is trying to turn or not; and
generating and displaying on a display device a composite image by inlaying each of the participant video image that is extracted into the virtual environment image at a corresponding position on the virtual environment image,
wherein the step of generating, if the own vehicle is not trying to turn, generates a front virtual image including the virtual environment image corresponding to a front line of sight of the driver and, if the own vehicle is trying to turn, generates a lateral virtual image including the virtual environment image corresponding to a line of sight in a direction of turn of the driver, and
wherein the step of displaying, if the own vehicle is not trying to turn, displays the composite image based on the front virtual image on the display device and, if the own vehicle is trying to turn, displays the composite image based on the lateral virtual image on the display device.

\* \* \* \* \*